United States Patent
Bushold et al.

(10) Patent No.: US 7,134,087 B2
(45) Date of Patent: Nov. 7, 2006

(54) SYSTEM AND METHOD FOR TRANSACTING PURCHASES WITH A CASH VENDOR USING POINTS

(75) Inventors: Thomas R. Bushold, Ellisville, MO (US); Mark A. Shipley, Ellisville, MO (US); Jeffrey L. Altemueller, St. Charles, MO (US); Stephen A. Sigman, Chesterfield, MO (US)

(73) Assignee: Maritz Inc., Fenton, MO (US)

( * ) Notice: Subject to any disclaimer, the term of this patent is extended or adjusted under 35 U.S.C. 154(b) by 626 days.

(21) Appl. No.: 10/117,309

(22) Filed: Apr. 5, 2002

(65) Prior Publication Data

US 2004/0230481 A1    Nov. 18, 2004

(51) Int. Cl.
G06F 3/00    (2006.01)

(52) U.S. Cl. .................... 715/764; 715/962; 705/14

(58) Field of Classification Search ................ 715/962, 715/733, 748, 751; 705/14, 26, 68, 69, 65
See application file for complete search history.

(56) References Cited

U.S. PATENT DOCUMENTS

| | | | |
|---|---|---|---|
| 5,287,268 A * | 2/1994 | McCarthy .................... 705/14 |
| 5,483,444 A | 1/1996 | Heintzeman et al. |
| 5,734,838 A | 3/1998 | Robinson et al. |
| 5,806,045 A | 9/1998 | Biorge et al. |
| 5,937,391 A | 8/1999 | Ikeda et al. |
| 5,966,700 A * | 10/1999 | Gould et al. ................ 705/38 |
| 6,009,412 A | 12/1999 | Storey |
| 6,016,504 A * | 1/2000 | Arnold et al. ............... 709/200 |
| 6,032,136 A | 2/2000 | Brake, Jr. et al. |
| 6,076,069 A | 6/2000 | Laor |
| 6,138,911 A | 10/2000 | Fredregill et al. |
| 6,148,330 A | 11/2000 | Puri et al. |
| 6,199,762 B1 | 3/2001 | Hohle |
| 6,330,544 B1 | 12/2001 | Walker et al. |
| 6,336,098 B1 | 1/2002 | Fortenberry et al. |
| 6,598,028 B1 * | 7/2003 | Sullivan et al. ........... 705/36 R |
| 6,675,178 B1 * | 1/2004 | Chinchar et al. ........... 707/201 |
| 6,819,340 B1 * | 11/2004 | Burke ........................ 715/738 |
| 2001/0037241 A1 | 11/2001 | Puri |
| 2001/0037243 A1 | 11/2001 | Rouston et al. |
| 2001/0054003 A1 | 12/2001 | Chien et al. |
| 2001/0054010 A1 | 12/2001 | Bernabeo et al. |
| 2002/0111859 A1 * | 8/2002 | Sheldon et al. ............... 705/14 |
| 2002/0147678 A1 * | 10/2002 | Drunsic ....................... 705/39 |
| 2002/0186254 A1 * | 12/2002 | Monbaron .................. 345/810 |
| 2003/0071841 A1 * | 4/2003 | Laronge et al. ............ 345/738 |
| 2003/0189589 A1 * | 10/2003 | LeBlanc et al. ............ 345/723 |

* cited by examiner

*Primary Examiner*—Kieu D. Vu
(74) *Attorney, Agent, or Firm*—Senniger Powers

(57) ABSTRACT

A system for permitting a participant to transact a purchase using awarded points with a vendor system which transacts purchases in currency. A loyalty program awards points to the participant. The awarded points are maintained in a point account for the participant. An application programming interface (API) interfaces with the vendor system. A program account for use in currency transactions provides the basis for the purchase with the vendor system. A graphical user interface (GUI) provides an interface between the participant and the API and for communicating with the loyalty program.

15 Claims, 7 Drawing Sheets

SYSTEM FLOW II

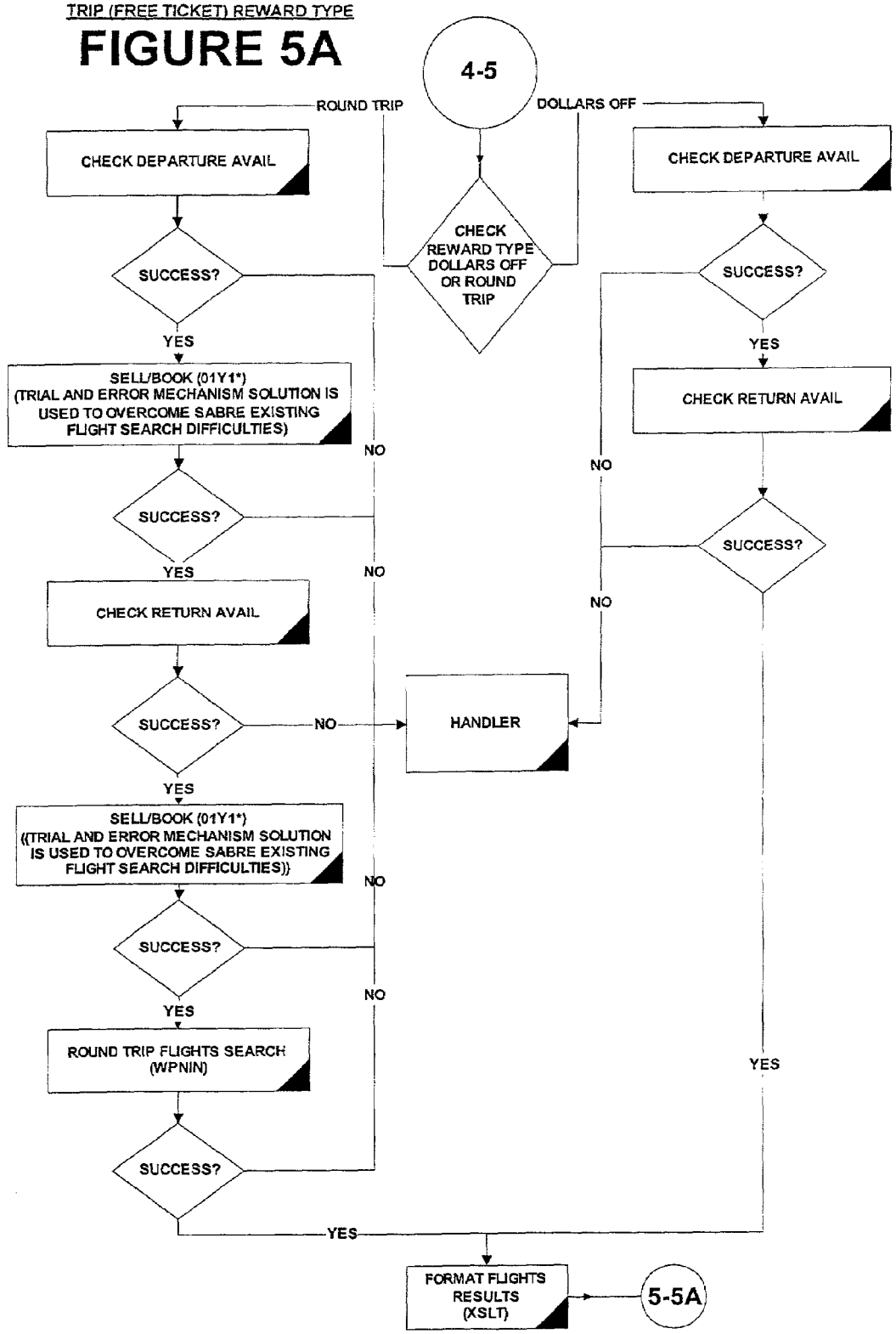

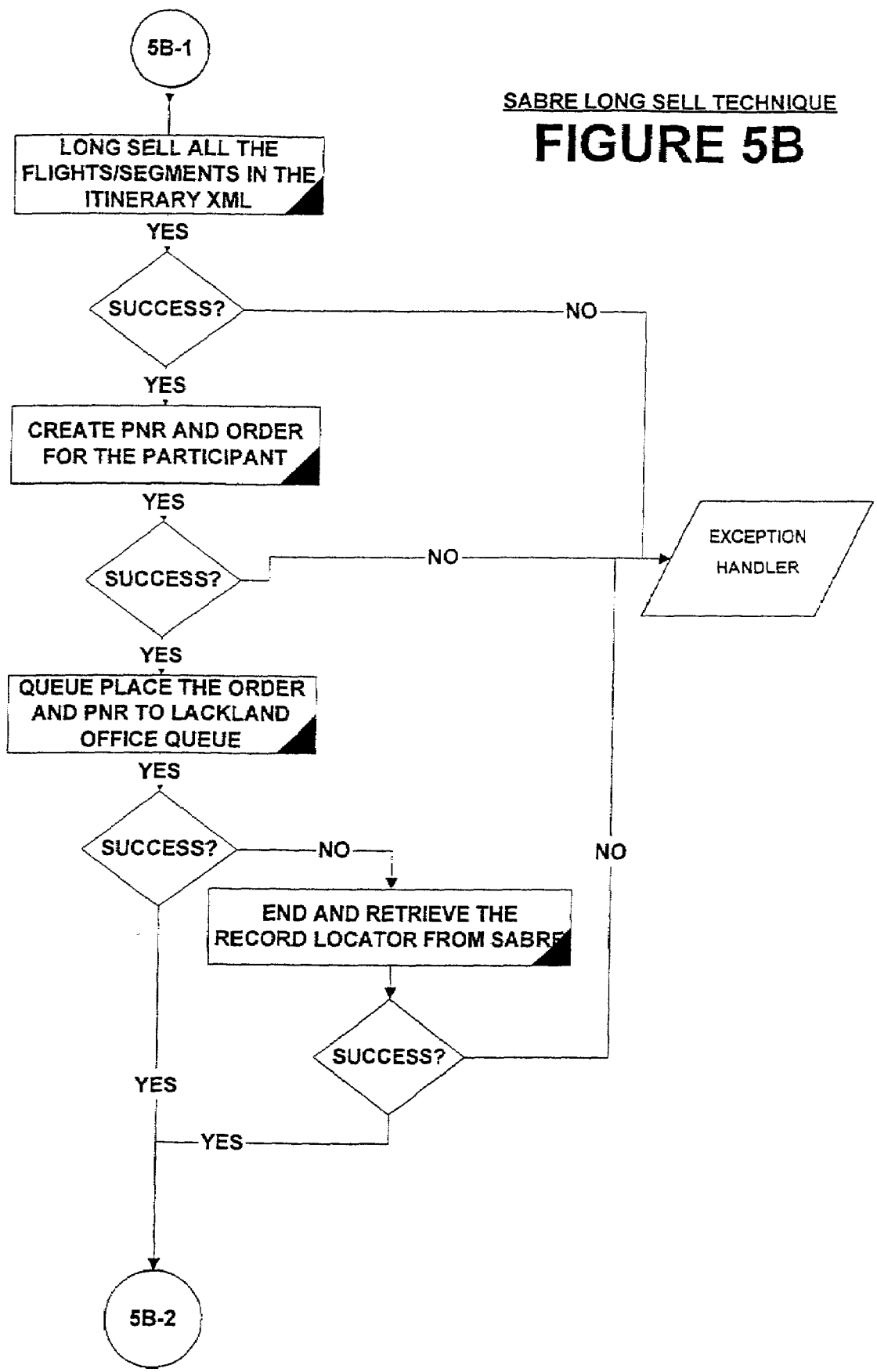

SYSTEM AND METHOD FOR TRANSACTING PURCHASES WITH A CASH VENDOR USING POINTS

TECHNICAL FIELD OF THE INVENTION

The invention generally relates to a system and method for redeeming points and, in particular, to a system and method in which a participant of a program which awards points to the participant allows the participant to transact a purchase using the awarded points with a vendor system which transacts purchases in currency.

BACKGROUND OF THE INVENTION

Customer incentive programs, such as loyalty programs, issue points to customers (i.e., participants) as a reward for certain activities such as the purchase of certain products or services or performing a certain action. These points create a loyalty or affinity with the customer and encourage the customer to continue a desired behavior. The customer is motivated through some type of reward offering which allows the customer to redeem the points for rewards. Frequently, such loyalty programs provide the customer with a limited listing of rewards from selected redemption vendors in the form of merchandise, certificates, or other products or services (henceforth referred to as rewards) and the number of points needed to obtain one of the rewards from the list. In general, the selected redemption vendors are a limited number which have some type of relationship, contractual or otherwise, with the loyalty program. The customer selects a reward for purchase with the points and indicates to the loyalty program that the particular product or service has been selected. The loyalty program obtains the product or service on behalf of the customer from one of the limited number of selective redemption vendors and provides it to the customer. Some rewards are of a nature that human intervention is needed to redeem/fulfill a reward. For example, if the customer selects a roundtrip airline ticket, the loyalty program on behalf of the customer or the customer directly would purchase the ticket through a selected travel agent or a selected airline employee and provide the ticket (or have it sent) to the customer. The points needed to obtain the reward (e.g., the ticket) are deducted from the customer's point account by the agent or employee.

As such, when a customer wants to redeem points for "high-touch" rewards, the customer has to work through a third-party organization. There is an opportunity to eliminate the human intervention to redeem such rewards by allowing the customer to systematically redeem their points for rewards using redemption vendors that otherwise deal in currency.

SUMMARY OF THE INVENTION

The invention addresses the above needs as well as others by providing a method and system for permitting a participant of a program to transact purchases with a currency vendor using points or a combination of points and currency rather than currency alone. The invention particularly addresses the needs for permitting a loyalty program participant to purchase airline tickets by providing the ability for a system and method which integrates to the reservation system indicating what the participant is attempting to buy (redeem). In addition, it provides fulfillment capability without having to involve highly specialized third party organizations. The invention enables participants to get greater satisfaction and more immediate gratification from their loyalty program regardless of their preferred method of interaction.

In one form, the invention comprises a system for use by a participant of a program which awards points to the participant, wherein the awarded points are maintained in a point account for the participant. The system permits the participant to transact a purchase using the awarded points with a vendor system which transacts purchases in currency. An application programming interface (API) interfaces with the vendor system. The system also uses a program account for use in currency transactions. A graphical user interface (GUI) provides an interface between the participant and the API and communicates with the program. The GUI includes instructions for receiving participant-related information from the participant and providing the received participant-related information to the API. The API is adapted to receive the participant-related information from the GUI and adapted to provide the received participant-related information to the vendor system. The API is adapted to receive vendor-related information from the vendor system and adapted to provide the received vendor-related information to the GUI. The GUI includes instructions for receiving vendor-related information from the API and for providing the received vendor-related information to the participant. From the perspective of the participant, the participant uses the GUI to conduct a purchase transaction with the vendor system based in whole or in part on the points in the participant's point account. From the perspective of the vendor system, the vendor system conducts the purchase transaction with the participant based on the program account.

In another form, the invention is a method for use by a participant of a program which awards points to the participant, wherein the awarded points are maintained in a point account for the participant. The method permits the participant to transact a purchase using the awarded points with a vendor system which transacts purchases in currency. The method comprises the steps of:

providing an interface between the participant and the vendor system;

converting a purchase request from the participant based in whole or in part on points into a corresponding purchase request based on a program account if the participant's account has sufficient points to cover the purchase; and causing the points for the purchase to be deducted from the participant's account in response to a received vendor purchase confirmation.

In another form, the invention is a graphical user interface for use by a participant of a program which awards points to the participant, wherein the awarded points are maintained in a point account for the participant. The interface permits the participant to transact a purchase using the awarded points with a vendor system which transacts purchases in currency. The interface comprises an application programming interface (API) for interfacing with the vendor system; a program account for use in currency transactions; and a graphical user interface (GUI) for providing an interface between the participant and the API and for communicating with the program. The GUI includes instructions for receiving participant-related information from the participant and providing the received participant-related information to the API. The API is adapted to receive the participant-related information from the GUI and to provide the received participant-related information to the vendor system. The API is adapted to receive vendor-related information from the vendor system and provide the received vendor-related information to the GUI. The GUI includes instructions for receiving vendor-related information from the API and providing the received vendor-related information to the participant. From the perspective of the participant, the participant uses the GUI to conduct a purchase transaction with the vendor system based in whole or in part on the points in the participant's point account. From the perspective of the vendor system, the vendor system conducts the purchase transaction with the participant based on the program account.

In another form, the invention is a system for permitting a participant to transact a purchase using awarded points with a vendor system which transacts purchases in currency, the system comprising:

a loyalty program which awards points to a participant, wherein the awarded points are maintained in a point account for the participant:

an application programming interface (API) for interfacing with the vendor system; a program account for use in currency transactions; and a graphical user interface (GUI) for providing an interface between the participant and the API and for communicating with the program.

Other objects and features will be in part apparent and in part pointed out hereinafter.

BRIEF DESCRIPTION OF THE DRAWINGS

FIG. 5A is a flow chart of block 502 of FIG. 5 which illustrates one preferred embodiment of the function of selecting an itinerary and presenting flight results.

FIG. 5B is a flow chart illustrating one preferred embodiment of the booking process 506 of the flow chart of FIG. 5.

Corresponding reference characters indicate corresponding parts throughout the drawings.

DETAILED DESCRIPTION OF THE INVENTION

Figure 1:
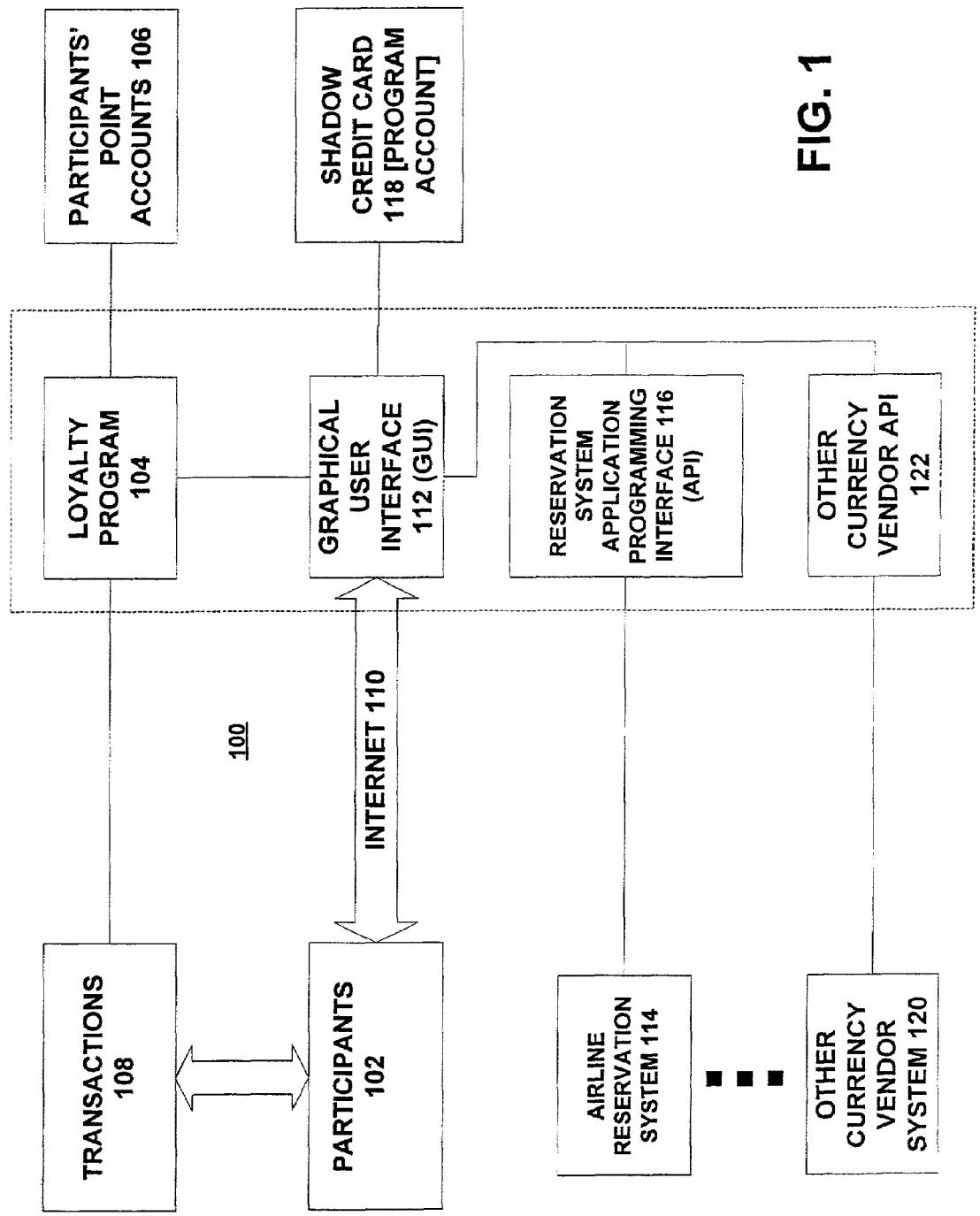
FIG. 1 is a block diagram of the system according to the invention.

FIG. 1 illustrates in block diagram form a system 100 according to one preferred embodiment of the invention. A participant 102 is a member of a participant/customer incentive program such as a loyalty program 104 which includes individual participant accounts 106 indicating the number of points that a participant has been awarded by the loyalty program. In one form, the loyalty program 104 monitors transactions 108 with the participant 102 and provides points to the participant's point account for completed transactions. For example, the loyalty program may reward participants for purchases of widgets from a particular vendor or group of vendors. For every dollar spent in purchasing a widget and completing a transaction, the participant would be awarded points which is added to the participant's point account.

From time-to-time, the participant 102 may use a communications link such as an Internet connection 110 to connect to a graphical user interface (GUI) 112 to access the loyalty program 104. In addition to checking the participant's point balance in the participant's account 106, the participant may check the rules of the loyalty program to determine how to obtain more points or to obtain the best use of points. In addition, the participant 102 may use the graphical user interface 112 to redeem points in the participant's account.

For example, suppose the participant 102 would like to purchase an airline ticket from an airline reservation system 114 using the points in the participant's account 106. Suppose further that the airline reservation system 114 is a standard third party vendor that has no particular connection to the transactions 108 or to the loyalty program 104. Suppose further that the airline reservation system 114 deals in currency only such as credit card transactions only and that the website provides an application programming interface (API) for use by others who desire to transact business with the third-party vendor through the website 114. By using the graphical user interface 112, a participant can access the airline reservation system via an airline reservation system API 116 which provides an interface between the airline reservation system 114 and the graphical user interface 112. Through the interface, the participant 102 can select a particular airline ticket for purchase and advise the graphical user interface 112 that the participant would like to purchase the airline ticket which has been selected. The graphical user interface 112 would then interface with the loyalty program 104 and the participant's point account 106 to confirm that the participant has sufficient points in their point account to cover the desired purchase. Assuming there are sufficient points, the graphical user interface 112 completes the transaction on behalf of the participant 102 by using a program account such as a cash account or a shadow credit card 118. The cash account is referred to as a program account because it is connected to the loyalty program 104. The program account may be an account acceptable to website 114 including credit or debit cards or other means of payment.

For example, the interface 112 may use a credit card which in the system 100 is referred to as a shadow credit card 118 because the credit card is hidden or "shadowed" from the participant so that the participant is not aware that the transaction is actually being transacted using the shadow credit card or other program account 118. Thus, the interface completes the transaction via the API 116 and purchases the desired ticket for the participant from the website 114 using the credit card 118. The interface 112 then advises the loyalty program 104 when the transaction has been completed so that the loyalty program can deduct the appropriate points from the participant's point account 106 which appropriate points correspond to the amount of points needed to purchase the airline ticket in the first place. Finally, the participant 102 is notified by the interface 112 of the completion of the purchase. In the case of an electronic ticket, the participant 102 would be sent a confirmation with the information relating to the ticket. In the event of a non-electronic ticket, the interface 112 would pass along the necessary participant information via the API 116 to the website 114 of the participant so that the website could arrange to have the ticket delivered or otherwise made available directly to the participant 102.

The system 100 as illustrated in FIG. 1 also contemplates that other currency vendor systems 120 may be available to the participant 102 via the interface 112 and a corresponding vendor API 122 (supplied by the vendor) so that the participant can select other goods or services by which points can be used to purchase the goods or services. For example, vendor system 120 may be a third party goods vendor on the Internet which vendor makes available its API 122 so that the graphical user interface 112 may provide interface between the participant and the API 122 of the vendor system 120 All that is needed is the vendor API 122 so that the GUI 112 can interface with the vendor system 120.

In summary, FIG. 1 illustrates system 100 for use by participants 102 of the loyalty program 104. The loyalty program 104 awards points to the participants 102 wherein the awarded points are maintained in the participants' point account 106. The system 100 permits the participants 102 to transact a purchase using the awarded points with vendor systems 114, 120 which transacts purchases in currency. The transacted purchase occurs via GUI 112 and API 116 based on shadow credit card 118. Alternatively, it is contemplated that the GUI 112 and the API 116 may be integrated into a single software package of instructions or that the loyalty program 104, GUI 112 and API 116 may be integrated or that the loyalty program and the GUI 112 may be integrated.

The above scenario assumes that the points in the account must be sufficient to pay for or cover the entire purchase of the reward, i.e., the airline ticket. Generally, other scenarios are also contemplated. For example, the system and method may be configured to allow the participant to select an amount of points to be used by the participant to pay for a portion of a particular transaction. In this case, the participant would be provided with the ability to supplement payment with their own currency or credit or debit card. As another example, the system and method may be configured to limit the amount of points to be used by the participant for a particular transaction. In this case, the participant would be required to supplement payment with their own currency or credit or debit card. As another example, suppose the participant has insufficient points to cover or pay for a particular reward. In this case, the system and method may be configured to allow the participant to select some or all of their points to be used by the participant to pay for a portion of a particular transaction and the participant would supplement payment with their own currency or credit or debit card. Those skilled in the art will recognize other scenarios as well.

In summary with regard to FIG. 1, the system 100 includes the API 122 for interfacing with the currency vendor system 120, a program account for use in currency transactions such as the shadow credit card 118 and the graphical user interface 112 for providing an interface between the participant 102 and the API 122 and for communicating with the loyalty program 104. The GUI 112 includes instructions for receiving participant-related information from the participant via the Internet 110 or by other means and providing the received participant-related information to the API 122. The API 122 is adapted to receive the participant-related information from the GUI 112 and provide the received participant-related information to the vendor system 120. In addition, the API 122 is adapted to receive the vendor-related information from the vendor system 120 and provide the received vendor-related information to the GUI 112. In particular, the GUI 112 provides instructions for receiving the vendor-related information from the API 122 and providing the received vendor-related information to the participant 102 via the Internet or other means. Thus, from the perspective of the participant 102, the participant uses the GUI 112 to conduct a purchase transaction with the vendor system 120 using the points in the participant's account 106. Thus from the perspective of the vendor system 120, the vendor system conducts the purchase transaction with the participant 120 using the shadow credit card 118.

Figure 2:
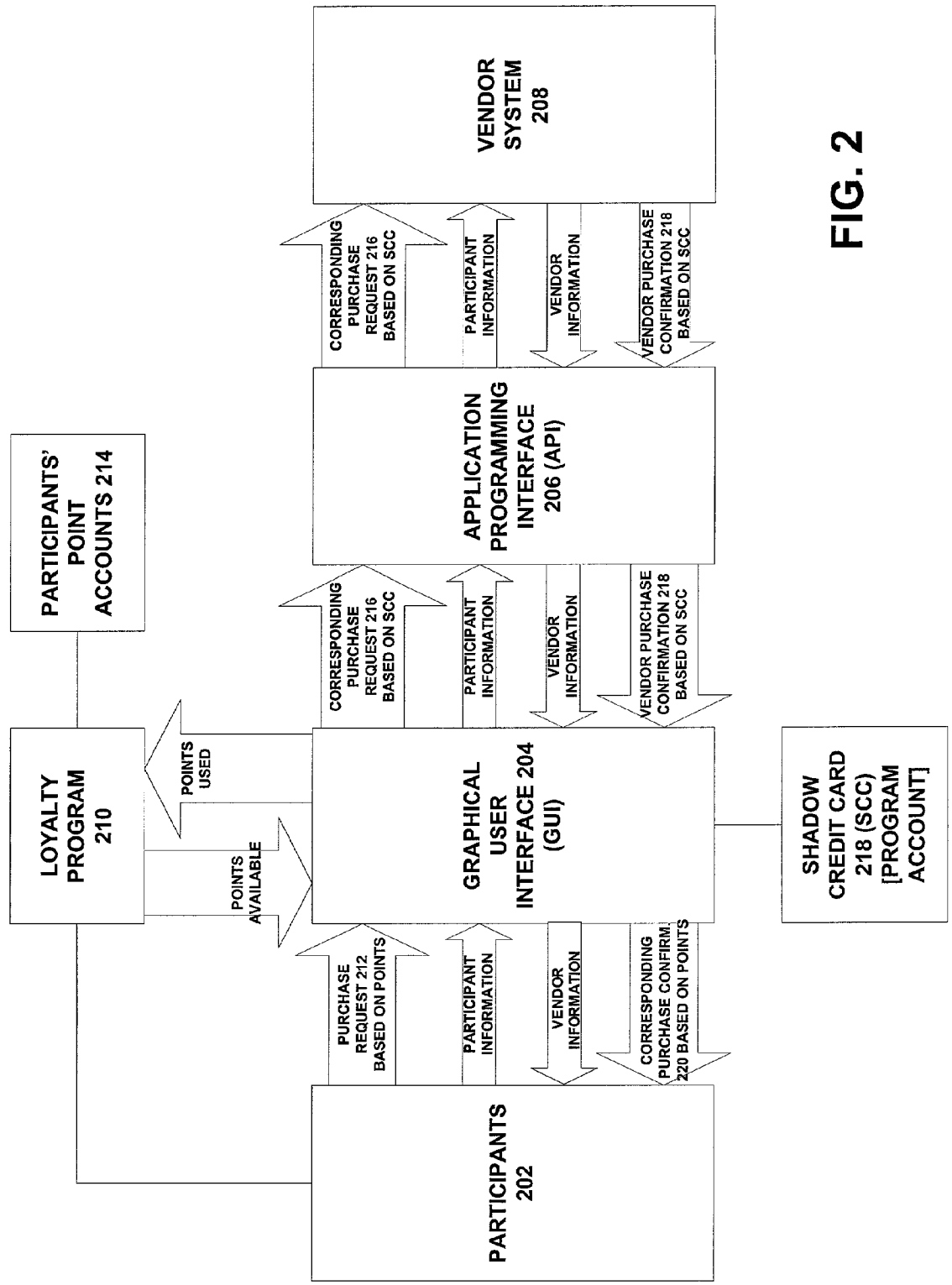
FIG. 2 is a flow diagram illustrating the flow of information between the participant, the GUI, the API and the vendor system according to the invention.

FIG. 2 is a flow diagram illustrating the flow information between the participant 202 and the vendor system 208 via the interface including GUI 204 and API 206. In addition, the GUI 204 interfaces with a loyalty program 210. In general, the GUI 204 provides participant-related information from the participant 202 to the API 206 and provides vendor-related information from the API 206 to the participant 202. As illustrated in FIG. 2, participant-related information generally flows left to right from the participant 202 to the vendor system 208 via the GUI 204 and API 206 whereas the vendor-related information generally flows right to left from the vendor system 208 to the participant 202 via the API 206 and GUI 204.

Participant-related information includes any participant information that originates from the participant such as a participant's name and address. Participant information also includes selections which the participant makes. For example, after the participant logs onto the GUI 204 and establishes their identity, a participant may indicate that he or she is interested in purchasing products or services from a particular vendor system and that the participant is interested in using points to make such a purchase. The GUI 204 will transfer the participant information to the API 206 of the vendor system 208. The API 206 in turn transfers the participant information to the vendor system 208. For example, if the participant 202 is interested in purchasing widgets, the participant information would include such an indication which is passed by the GUI 204 to the API 206 and then passed by the API 206 to the vendor system 208. In return, the vendor system 208 provides vendor-related information. Vendor-related information is any vendor information that originates from the vendor. In this example, the vendor system 208 would provide a listing of the widgets available and the price of each. This vendor information would be provided via the API 206 to the GUI 204 which would then provide the vendor information to the participant 202. The participant 202 could select a particular class of widgets or request additional information with regard to a particular widget which request would be participant information passed via the GUI 204 via the API 206 to the vendor system 208. Once again, the system 208 would respond to the request from the participant and provide vendor information.

In this process of exchanging participant information from the participant 202 to the vendor system 208 via the GUI 204 and API 206 and in this process of exchanging vendor information from the vendor system 208 to the participant 202 via the API 206 and the GUI 204, the participant 202 may eventually determine that a particular product or service is of interest to the participant 202 for purchase. Thus, the participant information also includes a purchase request based on points, generally referred to by reference character 212. Essentially the participant 202 is requesting a purchase based on points in the participant's account 214. In one preferred embodiment according to the invention, the GUI 204 is implemented in software which includes instructions for receiving the purchase request 212 from the participant 202, which purchase request intends to conduct a purchase with the vendor system 208 based on the points in the participant's account 214. The GUI 204 converts the received purchase request 212 into a corresponding purchase request 216 based on the shadow credit card 218. In order to accomplish this conversion, the GUI 204 communicates with the loyalty program 210 to determine the points that are available in the participant's point account 214. The purchase request 212 based on points is converted to a corresponding purchase request 216 based on the shadow credit card or other program account if the participant's point account 214 has sufficient points to cover the purchase requested by the participant. The GUI 204 provides the corresponding purchase request 216 based on the shadow credit card to the API 206. The API 206 performs its standard function of transmitting information to the vendor system 208 and in particular the API 206 is adapted to receive the corresponding purchase request 216 from the GUI 204 and provide the received corresponding purchase request 216 to the vendor system 208.

In general, the vendor system 208 responds to the corresponding purchase request 216 based on the shadow credit card in the same way that it would respond to any other purchase request from a consumer that presents a credit card. Assuming that all the information to consummate the purchase has been provided to the vendor system 208, and assuming that the shadow credit card is validated, the vendor system 208 generates a vendor purchase confirmation 218. The API 206 is adapted to receive the vendor purchase confirmation 218 based on the shadow credit card and provide the received confirmation 218 to the GUI 204. In its software implementation, the GUI 204 includes instructions for receiving the vendor purchase confirmation 218 based on the shadow credit card. The GUI 204 also includes instructions for causing the points for the purchase to be deducted from the participant's point account 214 in response to the received vendor purchase confirmation 218 based on the program account. In particular, the GUI 204 indicates to the loyalty program 210 the amount of points that have been used to complete the transaction. The GUI 204 also includes instructions for converting the received vendor purchase confirmation 218 based on the shadow credit card into a corresponding purchase confirmation 220 based on the points and instructions for providing to the participant 202 the corresponding purchase confirmation 220 based on the points. This is in response to the received vendor purchase confirmation 218 based on the program account.

Figure 3:
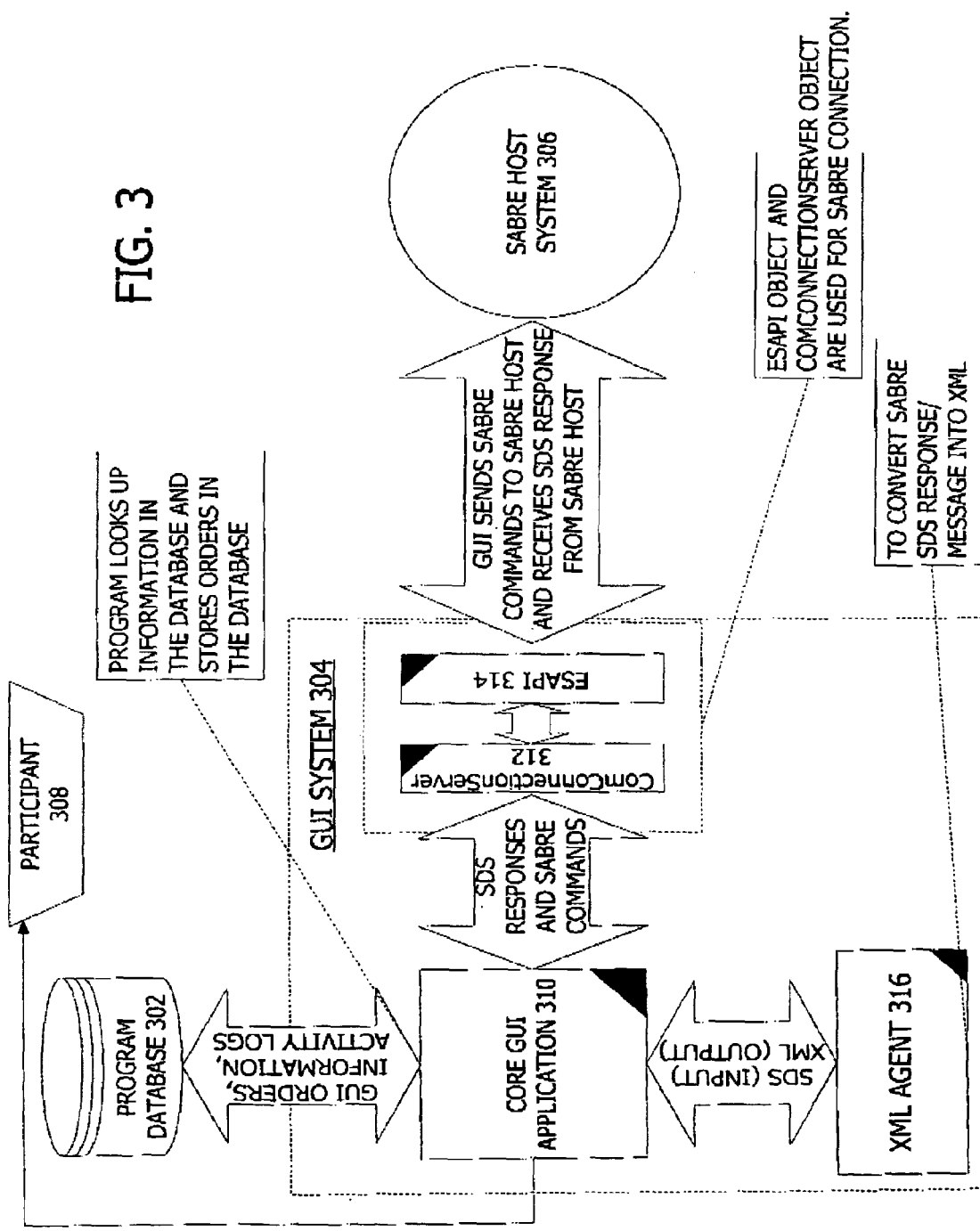
FIG. 3 is an architecture overview in block diagram form of one system for implementing the invention.

Referring to FIG. 3, a diagram of the architectural view of one preferred embodiment of the system according to the invention is illustrated. A loyalty program database 302 includes information relating to the loyalty program including the listing of the accounts of the participants. In FIG. 3, the architecture illustrates a GUI system 304 for interfacing with a SABRE host system 306. A participant 308 uses a core GUI application 310 of the GUI system 304 via a com-link 312 and an API 314 to communicate with the SABRE host system 306. The GUI core application 310 also interfaces with an XML agent 316 to convert information provided by the SABRE host system 306 into XML.

Figure 4:
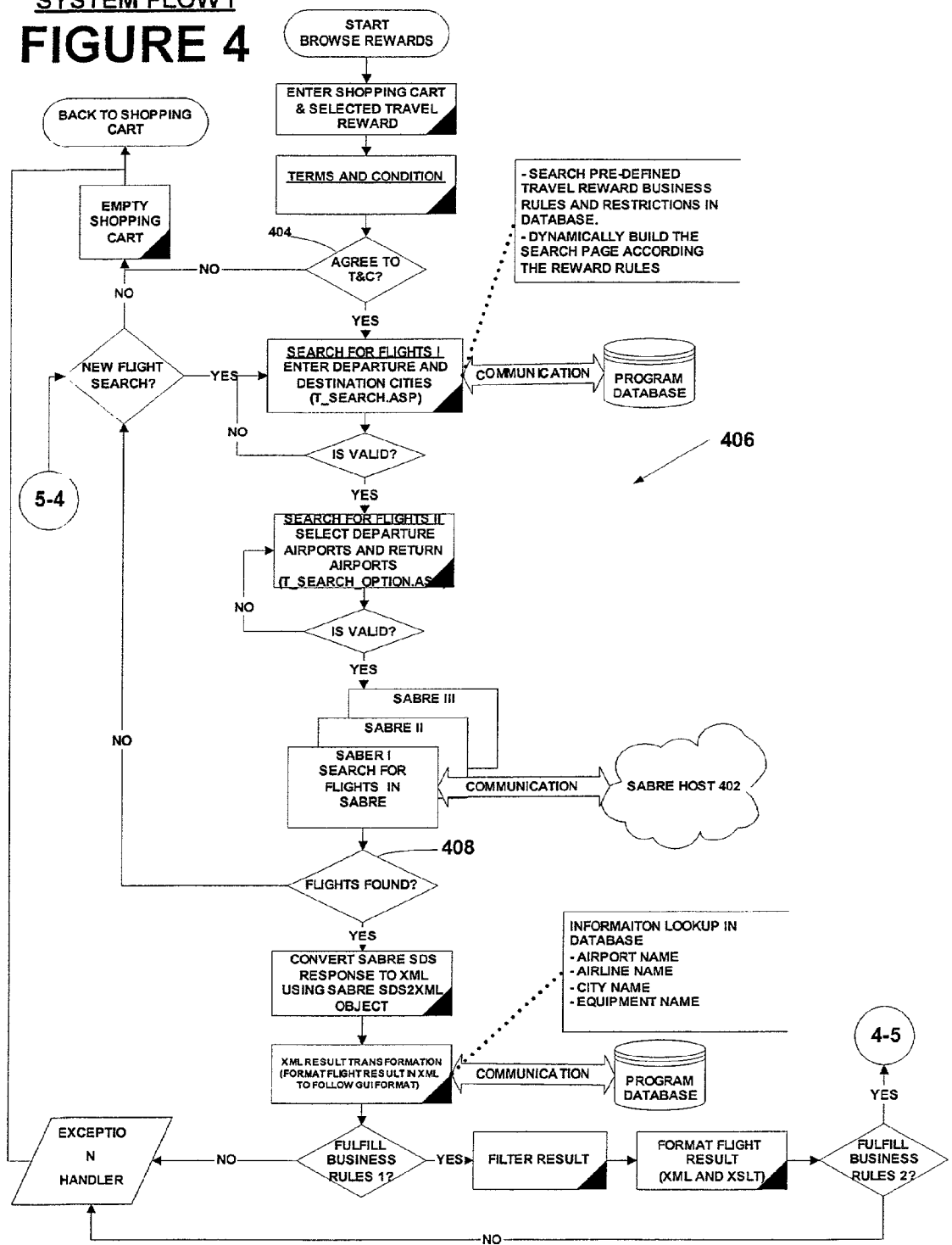
FIGS. 4 and 5 are flow charts of one preferred embodiment of implementation of the system and method of the invention.
Figure 5:
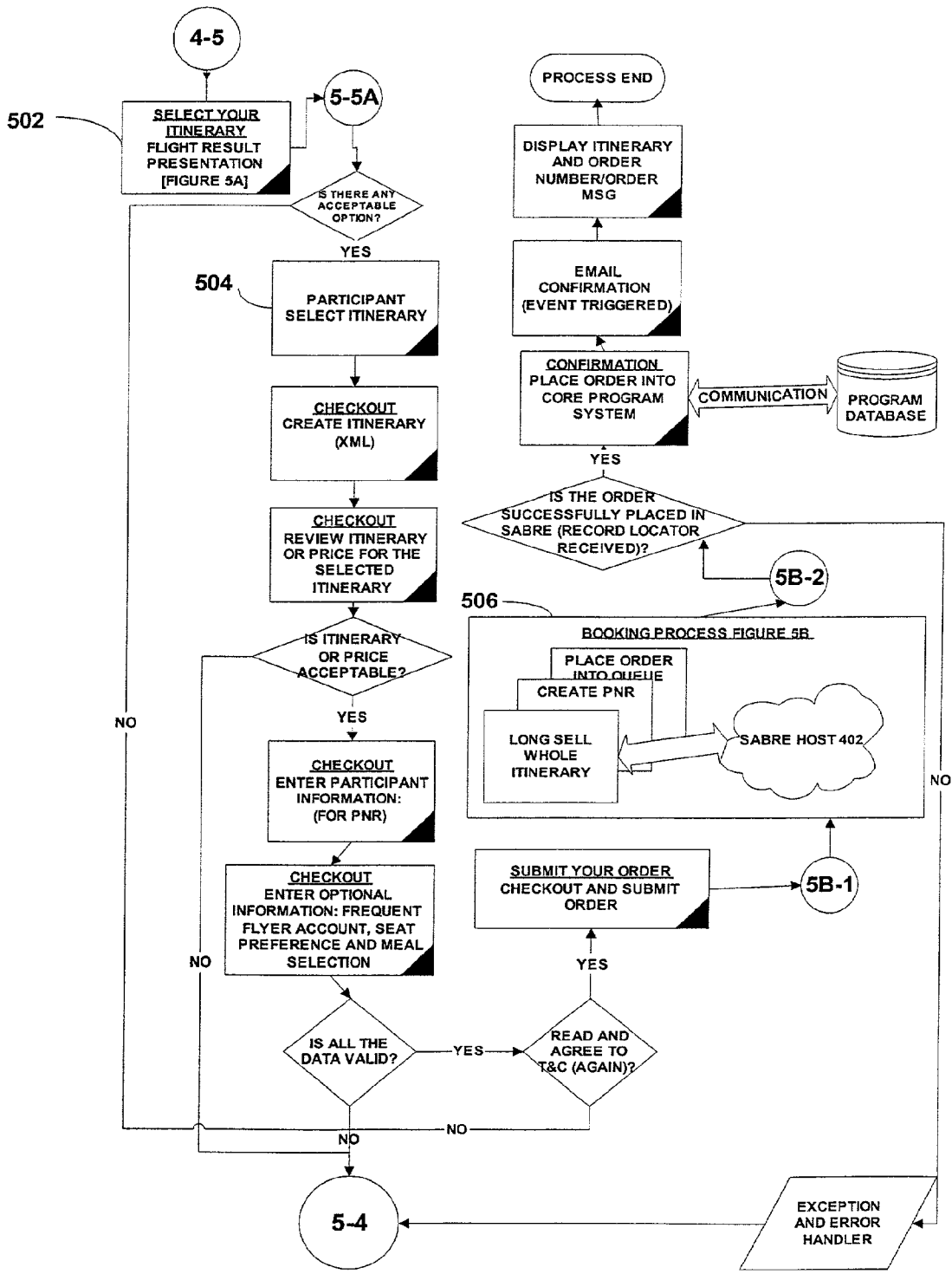

FIGS. 4 and 5 illustrate a flow diagram of the steps involved in a participant purchasing an airline ticket from a SABRE host 402. After agreeing to terms and conditions at 404, the participant proceeds to search for flights by the steps generally referred to by arrow 406. If a flight is found at 408, the participant proceeds to make an itinerary selection at 502 of FIG. 5, which selection is illustrated in more detail in FIG. 5A. After the participant selects the desired itinerary, at 504, the participant proceeds to check out and complete the process. This includes actually booking the ticket as indicated by box 506 and illustrated in more detail in FIG. 5B.

The above discussion has generally been focused on purchase of goods or services in situations where the participant has sufficient points in their point account to cover the purchase. However, it is also contemplated that the participant could use their points to conduct a partial purchase so that the transaction may be based in whole or in part on the points in the participant's account. For example, some points may be applied to part of the purchase price and the remainder of the purchase could be paid for by the participant by their our credit or debit card, cash or other participant account. Thus, "purchase as used herein includes a partial purchase as well as a complete purchase. Sometimes, this partial purchase arrangement is structured as a discount to the participant. Also, in some configurations, it may be necessary or desirable to charge or transact the full purchase with the vendor site using the shadow credit card. In this case, the portion of the purchase price paid for by the participant would be provided to the program or to the shadow credit card or other program account.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawing shall be interpreted as illustrative and not in a limiting sense.

What is claimed is:

1. A computerized system for use by a participant of a program which awards points to the participant, wherein the awarded points are maintained in a point account for the participant, said system for permitting the participant to transact a purchase using the awarded points with a vendor system which transacts purchases in currency, said system comprising a processor including instructions for defining:

an application programming interface (API) for interfacing with the vendor system;

a program account hidden from the participant connected to the program for use in currency transactions;

a graphical user interface (GUI) for providing an interface between the participant and the API and for communicating with the program;

wherein said GUI includes instructions for receiving participant-related information from the participant and providing the received participant-related information to the API;

wherein said GUI includes instructions for receiving information regarding the program account hidden from the participant and for providing the received program account information to the API;

wherein said API is adapted to receive the participant-related information and the program account information from the GUI and adapted to provide the received participant-related information and the received program account information to the vendor system;

wherein said API is adapted to receive vendor-related information from the vendor system and adapted to provide the received vendor-related information to the GUI; and wherein said GUI includes nstructions for receiving vendor-related information from the API and for providing the received vendor-related information to the participant;

such that from the perspective of the participant, the participant uses the GUI to conduct a purchase transaction with the vendor system based in whole or in part on the points in the participant's point account; and such that from the perspective of the vendor system, the vendor system conducts the purchase transaction with the participant as a currency transaction based on the program's program account hidden from the participant whereby the participant is not aware that the purchase transaction with the vendor system is being transacted using program account.

2. The system of claim 1 wherein the GUI includes instructions for:

receiving a purchase request from the participant to conduct a purchase with the vendor system based on the points in the participant's point account;

converting the received purchase request based on the points into a corresponding purchase request based on the program account if the point account has sufficient points to cover the purchase; and providing the corresponding purchase request based on the program account to the API wherein the API is adapted to receive the corresponding purchase request from the GUI and provide the received corresponding purchase request to the vendor system.

3. The system of claim 1 wherein the API is adapted to receive a vendor purchase confirmation based on the program account and provide the received confirmation based on the program account to the GUI, and wherein the GUI includes instructions for:

receiving the vendor purchase confirmation as a currency transaction based on the program account from the API;

causing the points for the purchase to be deducted from the participant's point account in response to the received vendor purchase confirmation based on the program account;

converting the received vendor purchase confirmation based on the program account into a corresponding purchase confirmation based on the points; and providing the corresponding purchase confirmation based on the points to the participant in response to the received vendor purchase confirmation based on the program account.

4. The system of claim 1 wherein the program is a loyalty program and wherein the program account is a shadow credit card.

5. In a computer having a user interface including a display, a method for use by a plurality of participants of a program which awards points to each participant, wherein the awarded points are maintained in a point account for each participant, said method permitting each participant to transact a purchase using the awarded points with a vendor system which transacts purchases in currency, said method comprising the steps of:

providing a program account hidden from the participant connected to the program for use in currency transactions;

providing an interface between the participant and the vendor system, said interface having access to information regarding the program account hidden from the participant;

converting a purchase request from a participant based in whole or in part on points into a corresponding purchase request provided to the vendor system based on the program account information if the participant's point account has sufficient points to cover the purchase request;

causing the points for the purchase request to be deducted from the participant's point account in response to a received vendor purchase confirmation of the corresponding purchase request whereby the participant is not aware that the purchase request provided to the vendor system is being transacted using the program account; wherein the interface comprises a graphical user interface (GUI) and an application programming interface (API) for the vendor system and:

wherein said GUI includes instructions for receiving participant-related information from each participant and providing the received participant-related information to the API;

wherein said API is adapted to receive the participant-related information from the GUI and to provide the received participant-related information to the vendor system;

wherein said API is adapted to receive vendor-related information from the vendor system and provide the received vendor-related information to the GUI; and wherein said GUI includes instructions for receiving vendor-related information from the API and providing the received vendor-related information to the participant;

such that from the perspective of each participant, the participant uses the GUI to conduct a purchase transaction with the vendor system based on the points in each participant's point account; and such that from the perspective of the vendor system, the vendor system conducts the purchase transaction with each participant based as a currency transaction on the program account.

6. The method of claim 5 wherein the GUI includes instructions for:

receiving a purchase request from the participant to conduct a purchase with the vendor system based on the points in the participant's point account;

converting the received purchase request based on the points into a corresponding purchase request based on the program account if the point account has sufficient points to cover the purchase; and providing the corresponding purchase request based on the program account to the API wherein the API is adapted to receive the corresponding purchase request from the GUI and provide the received corresponding purchase request to the vendor system.

7. The method of claim 6 wherein the API is adapted to receive a vendor purchase confirmation based on the program account and provide the received confirmation based on the program account to the GUI, and wherein the GUI includes instructions for:

receiving the vendor purchase confirmation as a currency transaction based on the program account from the API;

causing the points for the purchase to be deducted from each participant's point account in response to the received vendor purchase confirmation based on the program account;

converting the received vendor purchase confirmation based on the program account into a corresponding purchase confirmation based on the points; and providing the corresponding purchase confirmation based on the points to each participant in response to the received vendor purchase confirmation based on the program account.

8. The method of claim 5 wherein the program is a loyalty program and wherein the program account is a shadow credit card.

9. In a computer having a graphical user interface including a display, the graphical user interface for use by a participant of participants of a program which awards points to each participant, wherein the awarded points are maintained in a point account for the participant, said interface for permitting each participant to transact a purchase using the awarded points with a vendor system which transacts purchases in currency, said interface comprising:
- a program account hidden from the participant connected to the program for use in currency transactions of the plurality of participants;
- an application programming interface (API) for interfacing with the vendor system;
- said graphical user interface (GUI) providing an interface between the participant and the API and for communicating with the program, said GUI having access to the information regarding the program account hidden from the participant;
- wherein said GUI includes instructions for receiving participant-related information from each participant and providing the received participant-related information to the API;
- wherein said GUI includes instructions for receiving information regarding the program account information and providing the received program account information to the API;
- wherein said API is adapted to receive the participant-related information and program account information from the GUI and to provide the received participant-related information and the received program account information to the vendor system;
- wherein said API is adapted to receive vendor-related information from the vendor system and provide the received vendor-related information to the GUI; and
- wherein said GUI includes instructions for receiving vendor-related information from the API and providing the received vendor-related information to each participant;
- such that from the perspective of each participant, the participant uses the GUI to conduct a purchase transaction with the vendor system based in whole or in part on the points in the participant's point account; and
- such that from the perspective of the vendor system, the vendor system conducts the purchase transaction with each participant as a currency transaction based on the program's program account hidden from the participant whereby the participant is not aware that the currency transaction with the vendor system is being transacted using the program account.

10. The interface of claim 9 wherein the GUI includes instructions for:
- receiving a purchase request from each participant to conduct a purchase with the vendor system based on the points in the participant's point account;
- converting the received purchase request based on the points into a corresponding purchase request based on the program account it the point account has sufficient points to cover the purchase; and
- providing the corresponding purchase request based on the program account to the API wherein the API is adapted to receive the corresponding purchase request from the GUI and provide the received corresponding purchase request to the vendor system as a purchase request based on the program account.

11. The interface of claim 9 wherein the API is adapted to receive a vendor purchase confirmation based on the program account and provide the received confirmation based on the program account to the GUI, and wherein the GUI includes instructions for:
- receiving the vendor purchase confirmation as a currency transactions based on the program account from the API;
- causing the points for the purchase to be deducted from each participant's point account in response to the received vendor purchase confirmation based on the program account;
- converting the received vendor purchase confirmation based on the program account into a corresponding purchase confirmation based on the points; and
- providing the corresponding purchase confirmation based in whole or in part on the points to the participant in response to the received vendor purchase confirmation based on the program account.

12. The interface of claim 9 wherein the program is a loyalty program and wherein the program account is a shadow credit card.

13. A computerized system for permitting a participant to transact a purchase using awarded points with a vendor system which transacts purchases in currency, said system comprising a processor including instructions for defining:
- a loyalty program which awards points to a participant, wherein the awarded points are maintained in a point account for the participant;
- an application programming interface (API) for interfacing with the vendor system;
- a program account hidden from the participant connected to the program for use in currency transactions;
- a graphical user interface (GUI) for providing an interface between the participant and the API and for communicating with the program;
- wherein said GUI includes instructions for:
- receiving participant-related information from the participant and providing the received participant-related information to the API;
- receiving a purchase request from the participant to conduct a purchase with the vendor system based on the points in the participant's point account;
- receiving information regarding the program account hidden from the participant from the loyalty program;
- converting the received purchase request based on the points into a corresponding purchase request based on the program account information if the point account has sufficient points to cover the purchase; and
- providing the corresponding purchase request based on the program account information to the API wherein the API is adapted to receive the corresponding purchase request from the GUI and provide the received corresponding purchase request to the vendor system as a purchase request based on the program account information;
- wherein said API is adapted to receive the participant-related information from the GUI and to provide the received participant-related information to the vendor system;
- wherein said API is adapted to receive vendor-related information from the vendor system and provide the received vendor-related information to the GUI; and wherein said GUI includes instructions for receiving vendor-related information from the API and providing the received vendor-related information to the participant;

such that from the perspective of the participant, the participant uses the GUI to conduct a purchase transaction with the vendor system based in whole or in part on the points in the participant's point account; and such that from the perspective of the vendor system, the vendor system conducts the purchase transaction with the participant based on the loyalty program's program account hidden from the participant whereby the participant is not aware that the purchase transaction with the vendor system is being transacted using the program account.

14. The system of claim 13 wherein the API is adapted to receive a vendor purchase confirmation based on the program account and provide the received confirmation based on the program account to the GUI, and wherein the GUI includes instructions for:

receiving the vendor purchase confirmation based on the program account from the API;

causing the points for the purchase to be deducted from the participant's point account in response to the received vendor purchase confirmation based on the program account;

converting the received vendor purchase confirmation based on the program account into a corresponding purchase confirmation based on the points; and providing the corresponding purchase confirmation based on the points to the participant in response to the received vendor purchase confirmation based on the program account.

15. The system of claim 13 wherein the program account is a shadow credit card.

* * * * *